United States Patent
Wang et al.

[11] Patent Number: 5,156,857
[45] Date of Patent: Oct. 20, 1992

[54] EXTRUSION DIE FOR EXTRUSION BLOW MOLDING EQUIPMENT

[75] Inventors: James C. Wang, Norton, Mass.; Roger L. Kaas, Neenah, Wis.; Thomas T. Tung, Barrington, Ill.

[73] Assignee: American National Can Company, Chicago, Ill.

[21] Appl. No.: 717,162

[22] Filed: Jun. 17, 1991

Related U.S. Application Data

[63] Continuation of Ser. No. 276,354, Nov. 23, 1988, abandoned.

[51] Int. Cl.⁵ .............................................. B29C 47/18
[52] U.S. Cl. .................................... 425/130; 264/37; 264/176.1; 425/132; 425/133.1; 425/562
[58] Field of Search .................. 425/130, 131.1, 132, 425/133.1, 133.5, 562; 264/328.12, 37

[56] References Cited

U.S. PATENT DOCUMENTS

| | | | |
|---|---|---|---|
| Re. 24,577 | 12/1958 | Haines | 264/515 |
| 3,023,461 | 3/1962 | Sherman | 264/515 |
| 3,457,337 | 7/1969 | Turner | 264/173 |
| 3,976,226 | 8/1976 | Monnet | 425/130 |
| 4,149,839 | 4/1979 | Iwawaki et al. | 425/133.1 |
| 4,276,250 | 6/1981 | Satchell et al. | 264/167 |
| 4,522,775 | 6/1985 | Briggs et al. | 425/133.1 |
| 4,554,190 | 11/1985 | McHenry | 264/328.12 |
| 4,659,531 | 4/1987 | Ezaki | 425/525 |
| 4,824,618 | 4/1989 | Strum et al. | 264/37 |
| 4,907,957 | 3/1990 | Nakagawa et al. | 425/132 |
| 5,030,077 | 7/1991 | Orimoto et al. | 425/130 |

FOREIGN PATENT DOCUMENTS

| | | | |
|---|---|---|---|
| 0110493 | 6/1984 | European Pat. Off. | |
| 232902 | 8/1987 | European Pat. Off. | 425/132 |
| 3439285 | 8/1985 | Fed. Rep. of Germany | |
| 53-120773 | 10/1978 | Japan | |
| 36387 | 3/1979 | Japan | 425/132 |
| 60-187513 | 9/1985 | Japan | |
| 62-104707 | 5/1987 | Japan | |
| 1456198 | 11/1976 | United Kingdom | |

OTHER PUBLICATIONS

Iwawaki et al, "Coextrusion-blow molding for gas tanks and industrial parts," Modern Plastics, pp. 70-73, (Mar. 1977).

Luker, Keith, Lab Coextrusion Hardware, "Advances in Extension Technology Seminar," Killion Extruders, Inc., Princeton, NJ, Dec. 2-4, 1987.

"Intermittent coextrusion creates market potential," PM&E (Mar. 1988).

Patent Abstract of Japan vol. 11, No. 321(M-633) Oct. 20, 1987.

Primary Examiner—Tim Heitbrink
Attorney, Agent, or Firm—Robert A. Stenzel

[57] ABSTRACT

Disclosed are resin stream modulation or shut-off control apparatus for use in a multi-layer extrusion die head for forming a multi-layer plastic resin parison tube suitable for blow-molding. The tube can be formed into articles such as containers. By use of the apparatus, the tube, and accordingly articles therefrom can have layers which vary in thickness or can have portions wherein layers are omitted, e.g., portions which become flash. In an apparatus herein, there is a resin channel having an exit orifice defining a merge area where a first resin stream merges with at least one second resin stream. A die member adjacent to the exit orifice can define the resin channel. Movable means and the die element are caused to intermittently abut or contact one another at the merge area to control, i.e., modulate or shut-off, the flow of the first resin. There is preferably no contact downstream of the merge area. In another embodiment a volumetric increase in the flow of the first resin controls or prevents its flow. Methods are directed to utilizing the apparatus and for forming a container having a scrap layer substantially devoid of one or more selected resins. The multi-layer extrusion blow-molded article or container has a layer which includes scrap from parison sections which are substantially devoid of the selected resin(s).

7 Claims, 9 Drawing Sheets

EXTRUSION DIE FOR EXTRUSION BLOW MOLDING EQUIPMENT

This application is a continuation of application Ser. No. 07/276,354, filed Nov. 23, 1988, now abandoned.

BACKGROUND OF THE INVENTION

This invention relates to dies for extrusion blow-molding equipment, particularly dies which are usable for producing multi-layered parisons which are blow-molded into containers, methods of forming such containers and the tubular extrudate and to the parisons and containers themselves.

One patent of interest in this regard is U.S. Pat. No. 4,522,755 issued June 11, 1985, incorporated by reference herein, which discloses an extrusion blow-molding die for use in producing multi-layer tubular parisons which are then blown into bottles and other containers, methods of forming such containers and the containers themselves. Parisons are formed having multiple layers, including a scrap layer, and an oxygen barrier layer. U.S. Pat. No. 4,522,775 refers to U.S. Pat. Nos. 3,560,325, 3,595,740, 3,882,259, 3,955,697, 4,182,457, 4,234,663 4,047,868, 4,297,092, 3,802,826, 3,447,204, 3,478,139, 3,546,743, 4,042,661, 4,125,585, 4,134,952, 4,152,104, 4,042,661, 3,446,204, and 4,079,850 which are incorporated herein by reference.

U.S. Pat. No. 3,457,337, issued to Turner, discloses containers having a layer Ms in FIG. 3 and L2 in FIG. 5, which layer extends partially, but not totally, throughout the containers. These containers do not have a scrap layer. In the present invention, by contrast, all layers extend throughout the container, and the containers include a layer containing regrind of the parison scrap or "flash", which scrap or flash contains less than all of the layers of the parison portion used to make the container. Turner also discloses in FIG. 1, "valves" V1 and V2 in schematic form with no teaching of the construction thereof. Apparently, such valves progressively or gradually interrupt the flow of resin L2 between the extruder and the die. By contrast, as explained in detail herein, this invention is in specific apparatus and method for controlling and terminating resin flow operating within the die head itself.

The control of resin flow at the extruder, as opposed to within the die head, is also disclosed in U.S. Pat. No. 4,276,250 to Satchell et al. See also U.S. Pat. No. 3,023,461 to Sherman and Haines Reissue U.S. Pat. No. 24,577 which are directed to a different object, namely, control of thickness of the parison.

One aspect of the present invention is directed to the same general object as the aforesaid U.S. Pat. No. 4,522,755, namely, the continuous extrusion of tubular multi-layered parisons However, in the U.S. Pat. No. 4,552,755, the parison formed by the dies therein contain the same materials in all layers throughout the parison, i.e., not only in the parison portions that are encaptured within the molds and blown into the container, but also in the portions of the parison between the molds which are the "flash" or scrap. As is well-known, after the overall parison is formed, it is thereafter passed into one or more molds of a blow-molding machine, and the portions of the parison beyond or outside of the mold or between spaced-apart mold sets, which are not encaptured by the mold itself, are scrap. In the U.S. Pat. No. 4,522,755, however, method and apparatus and process were disclosed whereby such scrap can be utilized and fed back into the die as a layer, thereby reducing wastage of the scrap.

Another patent of interest is U.S. Pat. No. 4,149,839 (Iwawaki et al.) which discloses a multi-polymer stream extrusion die head for intermittently extruding, by positive displacement, a plurality of polymer materials to form parisons having portions with all of the materials introduced into the extruder die head and portions having less than all of such materials present. The apparatus utilizes the movement of a plurality of reciprocable ring pistons in the die head to regulate the flow of one or more of the polymer materials. More particularly, a ring piston is withdrawn in a direction opposite to the direction of flow to control or interrupt downstream movement of polymer material alongside or past the ring piston, to thereby terminate flow of said material from the die head. Contrary to the invention disclosed herein, the U.S. Pat. No. 4,149,839 does not disclose that any ring piston surface abuts or contacts a die member surface and another surface or structure formed by and between those contactive surfaces, to thereby shut-off or close-off resin flow through a channel.

The U.S. Pat. No. 4,149,839 also does not disclose the lack of die wall contact downstream of the resin combining or merge area beyond the contact point between contacting surfaces. The March 1977 issue of *Modern Plastics*, "Coextrusion-blow Molding For Gas Tanks and Industrial Parts", pg. 70 et seq., written by some of the inventors of the U.S. Pat. No. 4,149,839, discloses a coextrusion blow-molding accumulator having independent ring-piston rams for regulating component layer thickness from 0 to 100% of total thickness in multi-layer parisons, thereby making it possible to abruptly terminate one or more of the individual layers when desired and to obtain single resin trim for recycling. As disclosed in the publication, the ring piston rams are withdrawn to a point above the infeed port from the extruder while the rein channel is being recharged, and ring piston movement during extrusion is downward to a point just above the feed port orifice. In either the patent or the publication, there is no disclosure that the ring piston rams are moved further downward beyond that point to shut-off or close-off flow of resin from the feed port orifice.

It would be highly desirable in a continuous or intermittent extrusion blow-molding process or apparatus to be able, and it is an object of this invention, to selectively eliminate from the scrap portions of a parison, to the extent practically possible, one or more materials or one or more layers, especially those comprised of relatively expensive materials (e.g., a polyvinylidene chloride copolymer such as Saran or a methyl acrylate Saran, a "Saran", an ethylene vinyl alcohol polymer or copolymer containing (EVOH), etc.). Even if the scrap containing the thermally unstable materials "or" relatively expensive layers is recycled back into the die, it is less expensive to produce containers having flash or scrap with substantially less or none of such expensive layers. For example, oxygen barrier materials, such as EVOH, are currently used on a commercial basis by the Assignee hereof, and EVOH, relatively speaking, is a very expensive material. Accordingly, from a commercial standpoint, it is very desirable in this type of technology to have the capability to substantially eliminate from the scrap portions of the parison such expensive materials or layers, whether such scrap portions are to be recycled or not.

SUMMARY OF THE INVENTION

The apparatus of this invention may be broadly described as a multi-layer extrusion die or die head preferably for blow molding which includes resin shut-off (or flow control) means or apparatus, which preferably, includes, or is in the form of, a resin shut-off or flow control assembly located and operative within the die for producing a solid rod, a tubular extrudate or a continuous parison. The rod, extrudate or parison has alternating sections, herein designated X and Y. Each section X contains all the resin layers and each section Y, consists of, or includes, a portion which contains less than all of said resin layers. Each section X contains all the resin layers and is encaptured within a mold to form a container, and each section Y, not encaptured within a mold, consists of, or includes, a portion which contains less than all of said resin layers. The Y sections are the flash or scrap which may be recycled to form a layer of other containers. The die has a plurality of resin channels which preferably are annular for forming a tubular extrudate. The shut-off assembly or flow control assembly is located within the die or die head and controls the resin flow from a channel at selected intervals, preferably almost instantaneously. The flow control assembly includes a "B" resin channel and means for shutting-off, halting, interrupting, preventing, reducing or modulating flow of resin(s) through that channel. Preferably, the means is in the form of a die wall (the term "die wall" includes member, element or surface) and a movable element cooperative therewith. The resin flow "resin(s) stream B" through the channel (the resin(s) sometimes hereafter being referred to as "resin(s) B") downstream of the shut-off assembly can be eliminated—either virtually totally or at least substantially—so that structure or layer(s) formed from resin B are likewise eliminated or substantially eliminated from section Y. In the die or die head, there preferably is no structure or die wall in contact with the die wall which cooperates with the combining channel downstream of the point of contact between the die wall and the movable element. In other words, there preferably is no structure in the merge area of the die or die head channel (where the resin(s) B and other resins merge, downstream of the shut-off contact point between the die wall and the movable element) which would interfere with the free flow of the trailing marginal end portion of the shut-off resin(s).

The latter preferred features, of the lack of downstream wall contact and lack of structure in the merge area, are important aspects of the present invention. Actual tests conducted by the Assignee and fluid dynamic theory both indicate that, to the extent that there is such a downstream die-wall in contact with the first die wall in the resin flow path in the Merge Area ("MA") (defined below) at, or downstream of the point of control or shut-off by the assembly, or if the first die wall extends in the downstream direction beyond the point of contact with the movable element in the flow path of resin(s) stream B, then the flow of the "B" resin(s) stream is not sharply or cleanly shut-off to the desired extent from the portion of the parison section which is to become the flash or scrap. The preferred configurations are important because, in accordance with this invention, the shut-off or modulated resin(s) are prevented from contacting a structure or a wall downstream of the contact point or merge area. If there is such contact there would be dragging against or adherence to a structure or wall, or with stagnant resin or polymer material, the shut-off resin(s) B, contrary to the purpose of this invention, would not completely be eliminated in the desired, to-be-utilized portions of parison sections Y. To the extent that bleeding of resin B into the Y section can be tolerated, it is possible to have some tolerated related or causative minimal downstream structure or wall contact.

This invention further comprises a novel method for forming a solid rod or tubular extrudate or a hollow parison or preform for blow-molding and new parisons, articles and containers.

A primary purpose of the invention is to form a multi-layer tubular extrudate or tubular parison suitable for blow-molding into a novel container which for example would be especially suitable for products sensitive to oxygen permeation loss. As appropriate, hereinafter, the term "parison" includes an extrudate which can be in the form of a solid rod, a hollow preform or a tubular extrudate and these terms may be used interchangeably. Also, as indicated, it is an important feature of the present invention to provide a method and apparatus whereby, at selected intervals, certain materials, such as expensive ones, are selectively interrupted, shut-off, controlled or minimized to thereby eliminate or substantially reduce them from the parison sections Y which form the flash during the blow-molding. These materials usually are, but need not be, materials which comprise one or more interior streams and form one or more interior layers of the parison or container. The methods also include forming extrusion blow-molded articles, especially containers, from parison section X having one or more layers formed from recycled or reground scrap comprised of section Y. The scrap substantially does not contain the relatively expensive layer(s).

DETAILED DESCRIPTION OF THE PREFERRED EMBODIMENTS

Figure 1:
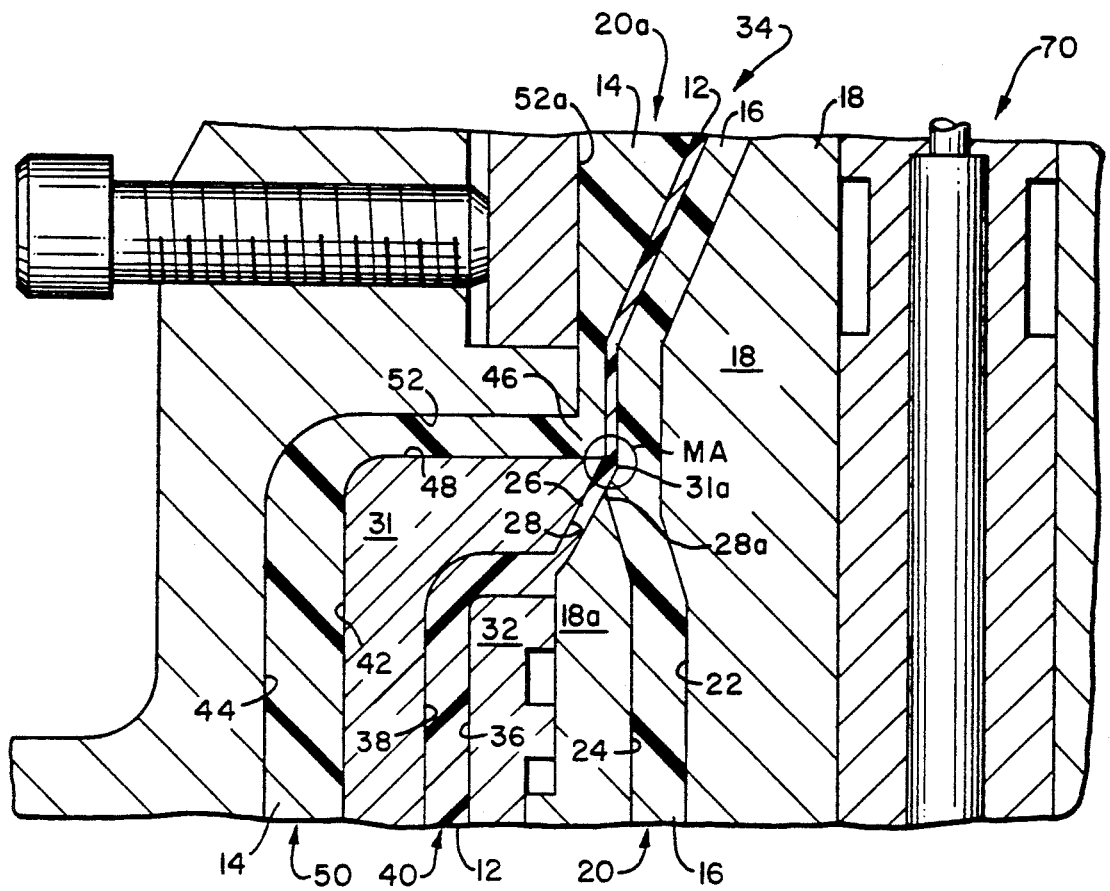
FIG. 1 is a vertical cross-section with portions broken away of a preferred embodiment of the shut-off assembly or mechanism employed in the die apparatus of this invention, shown in the open position.

FIG. 1 shows a portion of a preferred embodiment of the shut-off assembly or mechanism of this invention, generally designated 70, shown in a left-hand portion of a die head or apparatus.

More particularly, in FIG. 1 there is a resin stream generally designated 34 which is a combination, in layered form, of resin streams 14, 12 and 16 which previously were conveyed through independent channels. Sleeve support 18 is moveable and is preferably connected (by means not shown) to moveable means shown here as sleeve element 18a. The inner wall 22 of element 18 and the outer wall 24 of element 18a form a channel 20 which conveys a resin stream 16.

Sleeve element 18a also has a tapered wall 26 which is designed to fit flush or abut with the tapered surface or wall 28 of a first die member 31. In FIG. 1, the sleeve element 18a is shown retracted to allow resin stream 12 (which, for example, may be or include one or more expensive resins such as EVOH or other resins) to flow into combining channel 20a to form layered stream 34, here comprised of layers 14, 12 and 16. (Resin stream 12, which itself can include more than one resin stream, is sometimes, referred to herein as resin(s) stream B or merely stream B.)

In FIG. 1, resin stream 14 initially flows through a channel 50 defined by the wall 44, and wall 42 of first die member 31. Resin stream 14 enters the combining channel 20a at or through a location generally designated 46. At location 46, the channel 50 is defined by a wall or surface 48 of first die member 31 and, spaced apart therefrom in the down stream direction, a die wall surface 52.

In FIG. 1, resin stream 12 flows through channel 40 defined primarily by wall 38 of die member 31 and by wall 36 of die member 32, through the exit orifice of the continuation of channel 40 further defined by tapered wall 26 of sleeve element 18a and tapered wall 28 of die member 31, and then into combining channel 20a as an interior layer of resin stream 34. Its entrance in combining channel 20a occurs when sleeve element 18a is retracted as shown in FIG. 1.

Figure 2:
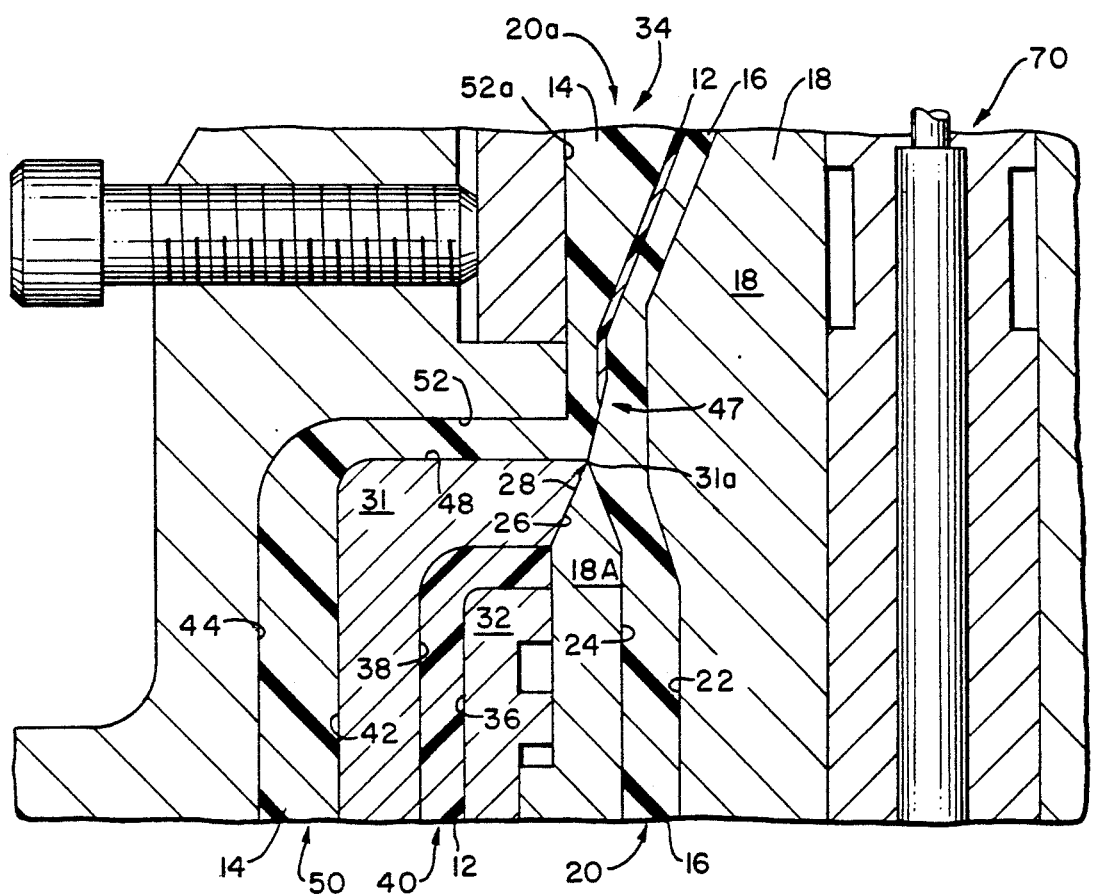
FIG. 2 is a vertical cross-section with portions broken away of the shut-off mechanism of FIG. 1, shown in the closed position.

FIG. 2 is like FIG. 1 except that in FIG. 2 the sleeve element 18a has been moved axially toward the exit of the die head so that its outer tapered wall 26 is in flush contact with the inner tapered wall 28 of element 31 thereby completely shutting off the flow of resin stream 12 into combining channel 34. The movement of sleeve element 18a is accomplished by suitable means, for example electro-mechanical or hydraulic means (not shown). The control means employed are a matter of choice provided they are operative to advance and retract sleeve element 18a of the shut-off assembly or system, as desired to produce parisons and containers of the type herein contemplated. The shut-off assembly of this invention includes the moveable sleeve member 18a, the surface or wall, e.g. of the member 31, with which it cooperates, including contact point 31a, to terminate or control flow and the die head apparatus is adapted by design to avoid or minimize undesired or undue contact between the trailing end portion of the shut-off resin stream and significant stagnant structure or material downstream of point 31a or the operative shut-off surfaces.

With respect to FIG. 2, it is important to note that there is no down stream die wall in direct contact with or extending in a downstream direction from surface 48 of first die member 31 at any location near or at the downstream-most (uppermost in FIG. 2) shut-off point of contact 31a between sleeve element 18a and wall 28 of member 31. It has been discovered that this preferred design makes it possible to selectively virtually completely eliminate resin stream 12 (resin(s) stream B, also sometimes referred to as resin(s) B) to the extent desired, from the parison sections Y which form scrap or "flash" between the molds, thereby achieving substantial savings in cost, see FIG. 5, where alternating sections are labeled X and Y. Of course, in commercial manufacturing techniques, in order to ensure that the container actually has all of the layers which are present in parison section X, the shut-off of resin stream 12 may be timed so that all of the layers extend for a short distance into parison section Y on either side of parison section X. For example, parison section Y may include all layers extending for example 10% of its length at either or both of its ends, so that in the latter case, the remaining 80% (central) portion of parison section Y contains less than all layers than parison portion X. As shown in FIG. 2, the shut-off mechanism has sharply terminated resin stream 12 at point 47, which termination occurred virtually immediately when channel 40 was closed by the shut-off assembly. It is to be noted that resin 12 e.g. the expensive EVOH resin, does not contact a die wall or surface downstream of shut-off point of contact 31a. Wall 52a is removed or offset (here, radially) from the flow path of resin 12 and there is no stagnant polymers in contact with the resin, such that there is no drag on the tail end of the resin stream, and its sharply terminated marginal end portion and/or tail end remains as it proceeds toward the die mouth.

Figure 1D:
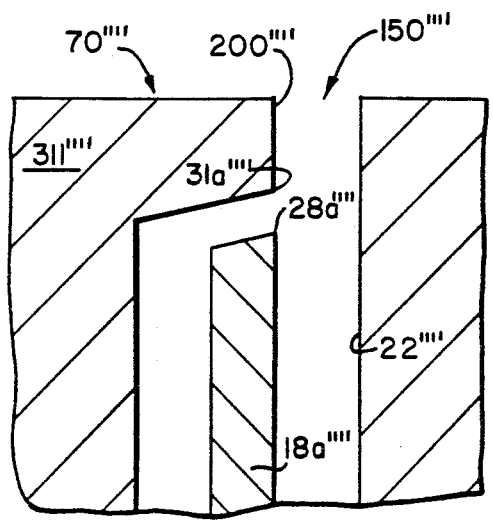
FIG. 1D is a vertical cross-section with portions broken away of yet another embodiment of the shut-off mechanism of this invention shown operative at the orifice of the die-head.

Again, if a clean shut-off of stream B is desired, that is, with little or no trailing resin material from resin stream 12 after shut-off, then there should be no contact, or as little contact as possible, of stream B with any downstream structure or stagnate polymer which would create a drag sufficient to cause the resin tail end of stream B to appear blurred in parison section Y. A preferred apparatus for accomplishing this shown in FIGS. 1 and 2 has no die wall in contact with die wall surface 48 or downstream from the downstream-most point of shut-off designated 31a, wherever that may be. Clean shut-offs and minimal or no downstream wall contact can also be obtained where the stream to be cut off has contact with a moving fluid such as resin stream 14 (as shown in FIGS. 1 and 2), or with air, as in the case where point 31a' is at the mouth of the die head, as shown in FIGS. 1A and 1B.

Figure 1A:
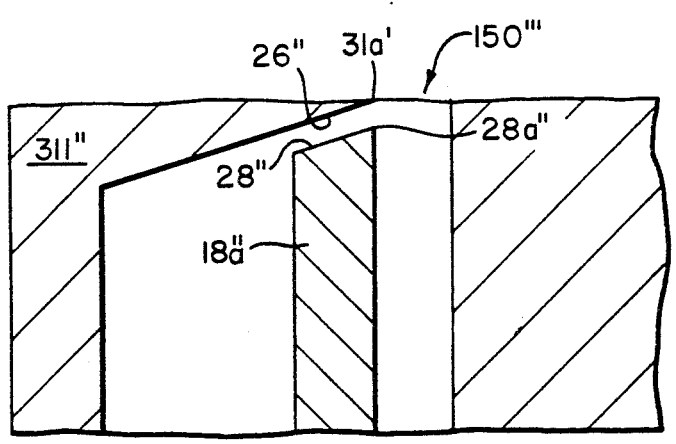
FIG. 1A is a vertical cross-section with portions broken away of another embodiment of the shut-off mechanism of this invention.
Figure 1B:
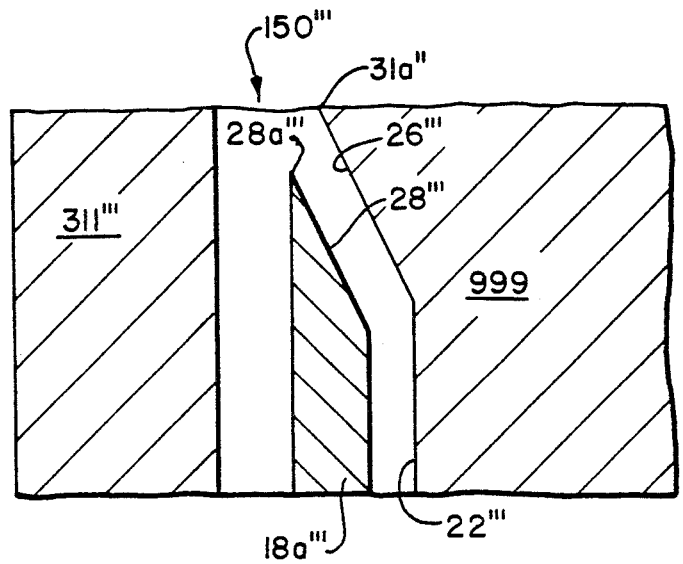
FIG. 1B is a vertical cross-section with portions broken away of yet another embodiment of the shut-off mechanism of this invention shown operative at the orifice of the die-head.

FIG. 1A shows that the upstream lip or upstream-most shut-off point of contact 31a' between sleeve support 18a'' and die element 311'' can be at the lip of die head mouth 150''. Similarly, FIG. 1B illustrates another configuration wherein the shut-off mechanism comprising sleeve support 18a''' can move into flush contact with die element 999 at 31a'''at the lip of the mouth 150''' of the die. These embodiments are adapted to cleanly shut off the outside layer of a two-layer (or, if desired, more than two-layer) stream. FIGS. 1A, 1B and 1D are preferred embodiments for producing parison sections X having 2 layers, and, of these three embodiments, FIGS. 1A and 1B are preferred. These latter embodiments are particularly suitable when the outside layer is a resin stream such as 12 or resin B.

Figure 1C:
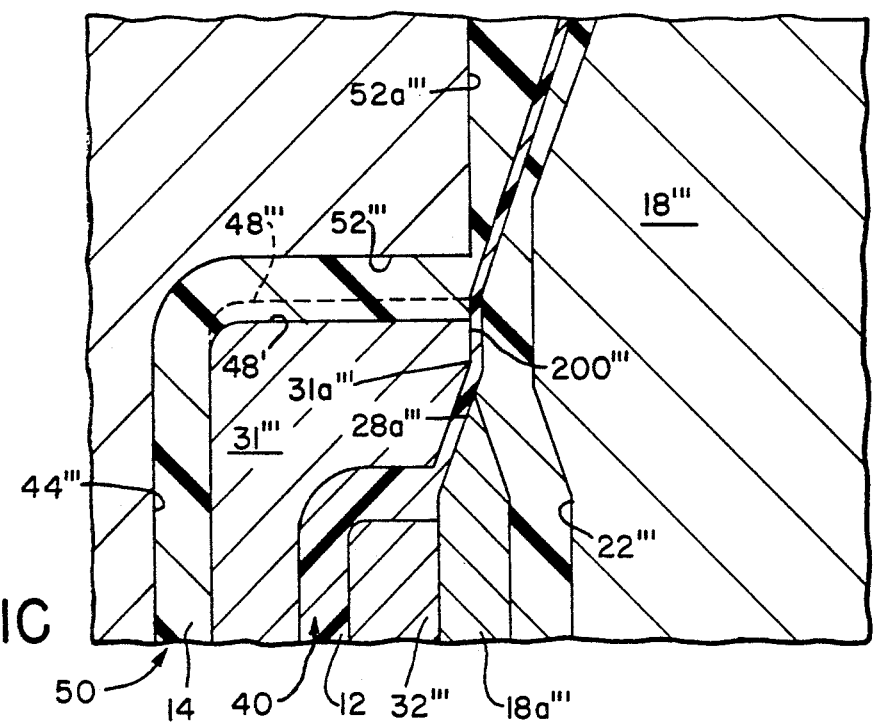
FIG. 1C is a vertical cross-section with portions broken away of yet another embodiment of the shut-off mechanism of this invention shown operative at the orifice of the die-head.

As shown in FIGS. 1C and 1D, if an amount of resin stream 12, or resin B, can be tolerated to appear in Section Y, e.g. 15% of the length of the Section Y, then some wall contact with resin stream 12 can be allowed to occur downstream of the downstream-most shut-off point, for example, along wall 200''' (FIG. 1C) or wall 200'''' (FIG. 1D), so long as the extent of structural contact or the length of the wall which will be in contact with resin stream 12, is correlated with and will not produce an amount or length of resin B in section Y which is greater than desired. For example, sleeve supports 18a''' and 18a'''' in FIGS. 1C and 1D respectively, can move to terminate flow sharply at point 31a''' or 31a'''', but die walls 200''' and 200'''' extend a length which would produce some contact of shut-off resin stream 12 with such die walls and some resin material of resin stream 12 in section Y. The length and design of die walls 200''' and 200'''' can be extended or adapted as desired to produce a flow rate and volume of resin stream 12 correlated to the relative flow rates and volumes of the resin streams involved. For example, whereas the length of wall 200''' might for example produce a drag of resin stream 12 which is sufficient to cause 15% of the length of section Y to include some resin B, the dashed line 48''' in FIG. 1C indicates a wall surface such that the length of wall 200''' downstream of the shut-off point might create, for example, 20% or any appropriate or desired percentage of the length of Section Y to include shut-off resin material from resin stream 12. As shown in FIG. 1D, the downstream wall 200'''' which could be in contact with resin stream 12 after it is shut off, can be at or adjacent to the mouth 150'''' of a die head 70''''.

Although the shut-off assembly of this invention preferably is used to shut-off the flow of a resin(s) stream, it can also be used to control or modulate the flow rate of resin(s) stream, e.g. resin stream 12 into combining channel 20a in FIG. 1 as parison sections X are being formed. This is accomplished by controlling sleeve element 18a in FIG. 1 by the aforesaid suitable means such that it acts as a throttle or choke to vary the gap or opening between sleeve element wall 26 and first die element wall 28. Optionally, such flow rate control could be accomplished where the stream(s) to be controlled merge(s) with one or more other flowing stream(s), for example at a merger area such as MA in FIG. 1.

Figure 3:
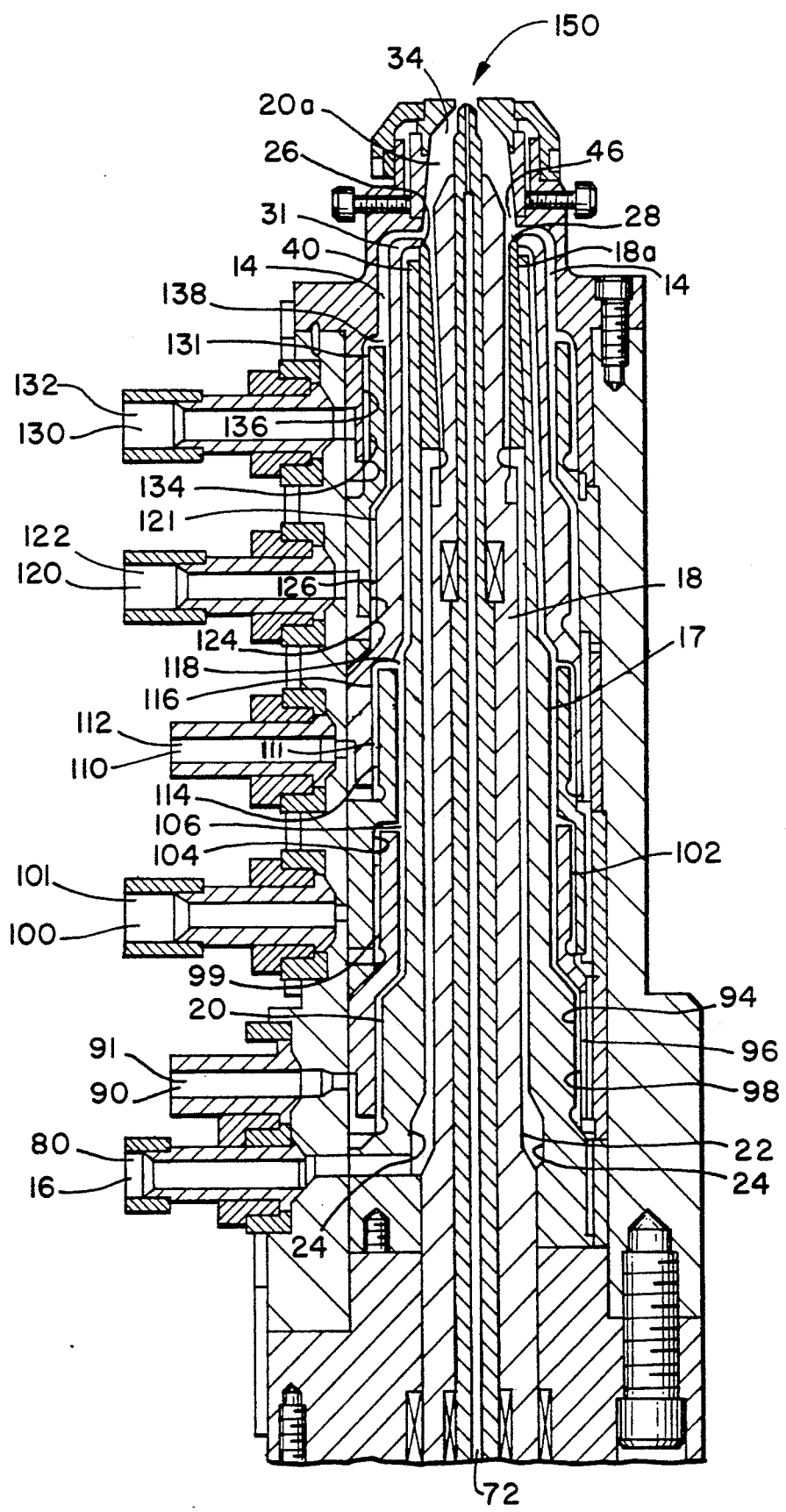
FIG. 3 is a view in vertical cross-section of an embodiment of a preferred die-head apparatus of the invention including the shut-off assembly.
Figure 5:
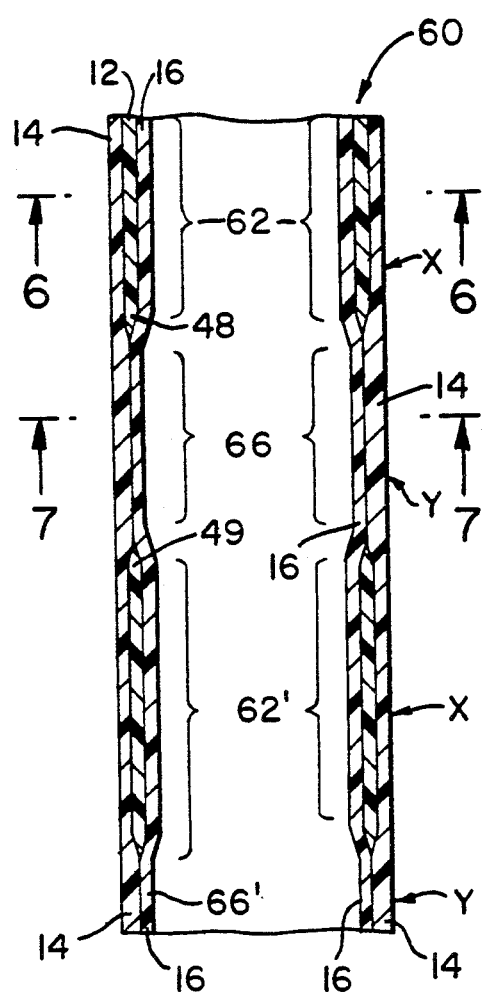
FIG. 5 is a cross-sectional view of the parison shown in FIG. 4 along the lines 5—5.
Figure 8:
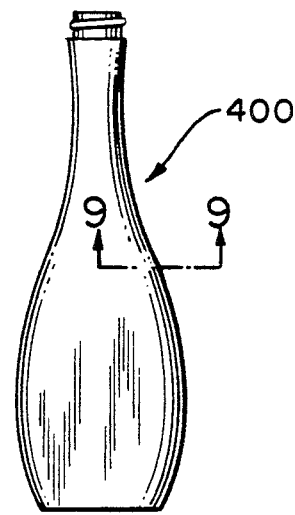
FIG. 8 is a perspective view of a six-layer container formed by the method, apparatus and parison of this invention.
Figure 9:
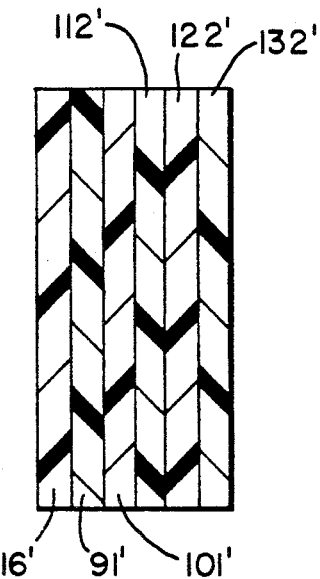
FIG. 9 is a cross-sectional view along the lines 9—9 of FIG. 8.

A preferred embodiment of the apparatus of this invention is shown in FIG. 3, which is a longitudinal cross section of an extrusion die head, generally designated 800, suitable for the continuous production of the multi-layered tubular parisons of this invention, which in turn are suitable for blow molding purposes. Die head 800 includes the shut-off die concept and assembly illustrated in FIGS. 1 and 2 and is thereby adapted to produce a parison, having Sections X and Y, as shown in FIG. 5, the former of which can be blow-molded into articles or containers having a six-layer wall of desired composition, such as shown in FIGS. 8 and 9. In the following description, the resins referred to for forming the parisons are for forming an oxygen-barrier container which has a scrap layer and which is particularly suitable for use as a food container.

In FIG. 3, die head 800 of an extrusion die apparatus has a number of stationary and moveable elements and includes ports and channels for the introduction of a number of different resins which form the different layers of the parison. In the center of the die, there is provided means, here, an axially moveable rod 72 for controlling wall thickness of the parison. Adjacent to rod 72 are means for shutting-off the flow of a resin(s) stream, here shown as including a moveable sleeve support 18 whose purpose and function will be explained subsequently.

Adjacent the bottom of FIG. 3, there is shown a first port 80 which serves to introduce a first resin 16 into the die head. The resin 16 in this embodiment may be a polyolefin such as polypropylene (PP) or polyethylene (PE) which serves to form a structural layer for the container formed by blow-molding the parison. However, in other embodiments, resin 16 may be any of a wide variety of thermoplastic materials such as polyethylene terephthalate (PET), polyvinylidene chloride (PVC), polycarbonates or copolyesters, such as sold under the trade designation Kodar ™ PETG Resin 16 flows through a channel 20, the outside wall of which is defined as 24 and the inside wall 22 of which is defined by the outer wall of sleeve support 18a. Above port 80, there is a second port 90 through which a second resin 91 is introduced. Resin 91 flows through a channel 98 defined by walls 94 and 96 of the die. In this embodiment, resin 91 is an adhesive, such as a chemically modified polyolefin. Downstream of the aforesaid ports is a third port 100 through which a third resin 101 is introduced into the die head, which resin flows initially through channel 99 defined by walls 102 and 104. In this embodiment, resin 101 preferably is a gas barrier comprised of a material such as an EVOH, nylon(s), or Saran. At the junction of channels 98 and 99, shown as 106, the resin streams 101 (barrier) and 91 (adhesive for forming the inside adhesive layer of the parison) are brought into contact with each other so that the barrier resin 101 is on the outside of inside adhesive resin 91 to form a combined layered resin stream 17.

Through a fourth port 110 downstream of the first three ports, a fourth resin 112, which in this embodiment is preferably the same adhesive as 91, is introduced. Resin 112 flows into the die head through a channel 111 defined by walls 114 and 116. At the location 118, the outer adhesive or fourth resin 112 merges with resins 101 and 91 to form layered resin stream 12, whose layers in this embodiment comprise adhesive resin 112 as the outside layer, barrier resin 101 as the middle layer and adhesive resin 91 as the inside layer which flows to location 40.

Through a fifth port 120, a fifth resin 122 is introduced which resin flows into the die head via a channel 121 defined by die walls 124 and 126. Resin 122 in this embodiment is or includes scrap, i.e., it is or includes a regrind of the flash from previous parison sections Y which were not molded into a container. Resin 112 may also include a regrind of defective containers, and/or virgin resin materials(s).

Through a sixth port 130, a sixth resin 132 is introduced, which resin flows into the die head through a channel 131 defined by die walls 134 and 136. In this embodiment, resin 132 forms an outside layer of the container and preferably is a structural material such as a polyolefin (e.g. polypropylene or polyethylene or blends thereof), or may be any of a wide variety of other thermoplastic materials such as PET, PVC, PETG, polycarbonate, etc. At location 138, sixth resin 132 merges with resin 122 so that resin 132 forms the outside layer of, and scrap-containing resin 122 forms the inside layer of, combined resin stream 14.

It will be observed that in the die head shown in FIG. 3, moveable sleeve element 18a of the shut-off assembly of this invention is shown in the open position. As previously explained, sleeve element 18a can be moved axially toward die mouth or orifice 150 into contact with wall 28 of first die element 31 to close channel 40 which contains the resin stream of layers 112, 101 and 91, outer layer to inner layer, respectively.

In or at a merge area, generally designated MA (see FIG. 1), resin stream 12 enters combining channel 20a and resin streams 14, 16 and 12 are normally combined to form a multi-layer stream 34 (see FIG. 3) which exits from the die head at 150 and forms a continuous parison 60 (a portion of which is shown in FIGS. 4-7) which is thereafter fed to any suitable molding apparatus, such as shuttle molds or spaced-apart molds on a rotary wheel (not shown) which are the preferred embodiments for forming containers. These containers, as indicated by FIGS. 4-7, encapture sections 62 or portions thereof designed 62' (also labeled "sections X" in FIG. 5) of parison 60 which contain all layers of the parison, from which preferred containers of this invention are formed by blow molding. These containers may be made from the entire section X or from only a portion thereof. The remainder of the parison 60, labeled as "sections Y" in FIG. 5, i.e., the parison sections 66 (which include little or no barrier layer), or sections 66' (portions of which include some barrier layer are scrap or flash.

Figure 3A:
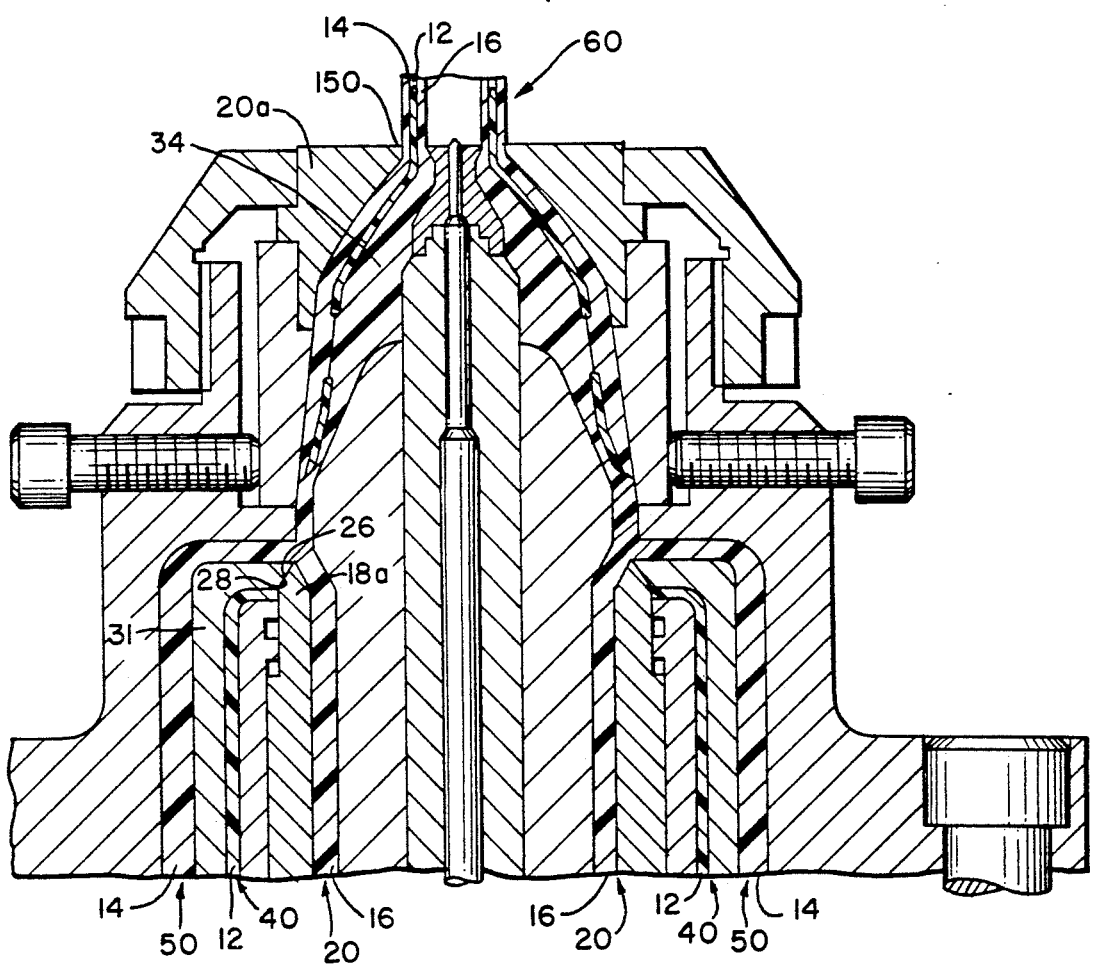
FIG. 3A is an enlarged vertical cross-section of the upper end of the die-head apparatus of FIG. 3 of the invention.

In FIG. 3A, the flow of resin stream 12 from channel 40 into combining channel 20a has been shut-off by the shut-off mechanism of this invention, shown and described in connection with FIGS. 1, 2 and 3. FIG. 3A shows that sleeve element 18a has been moved so that its tapered wall 26 is in operative contact with the tapered wall 28 of element 31, thereby closing channel 40 and shutting off flow of resin stream 12. As shown in FIG. 3A, this is done at selected times so as to control and terminate flow of, and thereby minimize or prevent the presence of resin(s) B or of a layer formed from resin stream 12 in sections 66 or 66'. This minimizes or eliminates resin B consisting or comprised of, for example, a relatively expensive barrier material such as EVOH, in portion 66 or 66' of the parison 60 which will eventually become the flash (or scrap) on either side of the blow-molded container. An examination of the composition of combined resin stream 34 in combining channel 20a of FIG. 3A, shows that sleeve element 18a was opened to start flow of resin stream 12 (see leading edge of that stream in the parison portion exterior of die head mouth 150), then closed for a short period to terminate its flow, then reopened, and then, as shown, re-closed.

When sleeve element 18a of FIG. 3A is retracted vertically downward, as shown in FIG. 1, the resin stream 12 joins resin streams 16 and 14 as an interior layer thereof to form, in merge area MA, combined layered resin stream 34.

Figure 4:
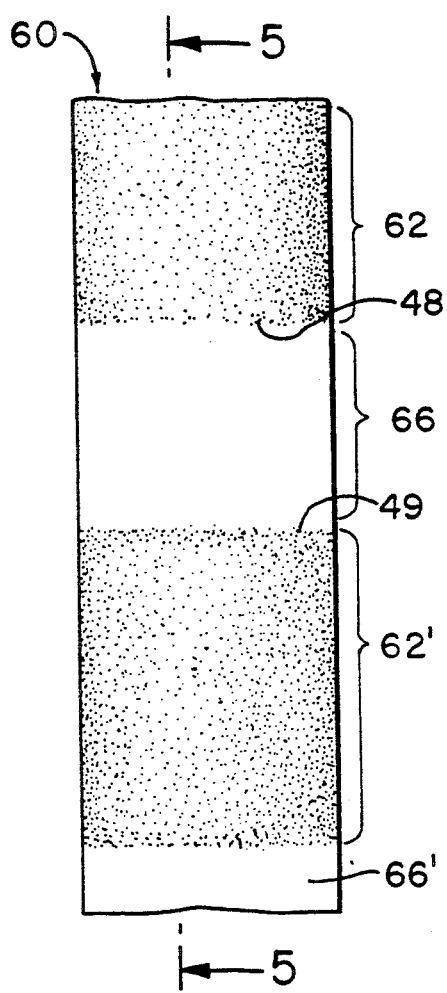
FIG. 4 is an elevational view with portions broken away of a parison formed by the apparatus and method of the present invention.

In FIG. 4, the stipling represents resin(s) B material from resin stream 12. FIG. 4 shows a multilayer parison 60 which can be produced by the method and apparatus of this invention, having sections 62 or 62' which contain all of the resins or the layers formed from all of the resin streams, and which are to be encaptured with the molds. The sections of parison 60 which preferably do not contain resin of resin streams 12 (or, if desired, contain minor portions thereof) are indicated as 66, 66', respectively. These will become the scrap or flash, i.e., the part of the parison which will not be formed into a container as they will be outside of, beyond, or between the mold or molds.

FIG. 5, a cross section taken through parison 60 along line 5—5 of FIG. 4, illustrates the wall construction of parison 60 wherein all of resin layers 14, 12 and 16 are present in sections 62 of 62'. Sections 62, 62' are used to form the blow molded container. Sections 66 contain only layers 14 and 16. Sections 66' have a portion or portions of their length which include resins (B) or resin stream 12. Sections 66 and/or 66' will become the flash or scrap which (if desired) will be reground and fed back into port 120 as part of resin 122, as indicated by FIG. 3.

Figure 6:
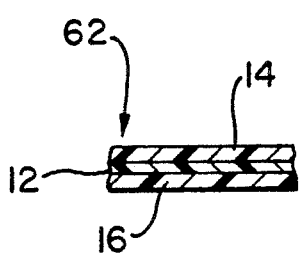
FIG. 6 is a cross-sectional view with portions broken away as would be taken along the lines 6—6 of FIG. 5.

FIG. 6, a cross section taken through line 6—6 of FIG. 5, shows the wall of section 62 or 62' of the parison in more detail and shows the layer formed from resin stream 12.

Figure 6A:
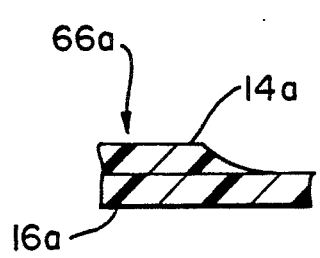
FIG. 6A is a cross sectional view of a two layer parison of the present invention.

FIG. 6A shows an alternate embodiment whereby the wall portion 66a shown contains only the materials of layers formed from resin streams 14a and 16a. The portion containing only 16a will become scrap or flash which (if desired) will be reground and fed back as part of resin 122 in accordance with the present invention.

Figure 7:
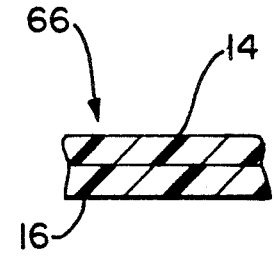
FIG. 7 is a cross-sectional view with portions broken away as would be taken along the lines 7—7 of FIG. 5.

FIG. 7, a cross section of parison 60 taken along the line 7—7 of FIG. 5 shows the result of the shut off or control assembly of this invention having shut off the expensive material(s) of resin stream 12 whereby the wall portion shown taken from section 66 or 66' of the parison does not contain the selectively excluded (expensive) material(s) (resin(s) B) of resin stream 12, which are present in FIG. 6. Thus, in FIG. 7, the wall of the parison section 66 or 66' contains only the materials of layers formed from resin streams 14 and 16.

FIG. 8 shows an extrusion blow-molded six layer container 400 made from all or a portion of parison section 62 or 62' by method and apparatus of this invention.

As shown in FIG. 9, a cross-section of the wall of the container of FIG. 8, the wall of container 400 has an outer structural layer 132', a scrap-containing layer 122', an outer adhesive layer 112', a gas barrier layer 101', an inner adhesive layer 91' and an interior structural layer 16', each respectively formed from resins 132, 122, 112, 101, 91 and 16. What is particularly unique about the above construction is that the scrap-containing layer 122' comprises a regrind of parison sections 66 or 66' (sections Y), at least a portion, preferably at least a major portion of which which contains less than all of the layers of the parison utilized to form container 400. In this case, preferably barrier layer 101', being expensive material, has been virtually eliminated from that section of the parison between the molds. (Of course, it may be desirable, in some instances, to (also) add discarded container regrind to the parison flash (scrap) regrind and/or to add other resin(s) to comprise the resin(s) for forming scrap-containing layer 122'. The same can be true for all other embodiments of the invention described herein.)

Although the die-head shown in FIG. 3 which incorporates the shut-off assembly of this invention is designed to produce a six layer parison 60 with shut-off sections 66 or 66' (which can be the same as sections Y as defined herein) alternating with sections 62 or 62' (sections X), to form such a container 400, the shut-off mechanisms, e.g. those illustrated in FIGS. 1–3A can be used in connection with other die-head designs and may be used to produce parisons with shut-off portions of any number of layers, i.e., more than 6 layers, or less than 6 layers. In addition, the resins used may be selected from a wide variety of thermoplastic materials.

Figure 10:
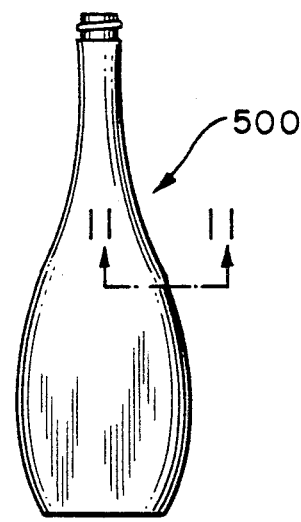
FIG. 10 is a perspective view of a two-layer container formed by a method, apparatus and parison of this invention.
Figure 11:
FIG. 11 is a cross-sectional view along the lines 11—11 of FIG. 10.

FIG. 10, for example, shows a two layer container 500, the walls of which comprise layers A and B (FIG. 11), in which the scrap-containing layer A is the continuous layer in the formation of the parison. If the apparatus of FIG. 1 is used to produce such a parison, the scrap resin of which layer A is comprised should be introduced into channel 20 or 50 of FIG. 1 and the other resin(s) of which layer B is comprised is or are introduced into channel 40 and selectively shut-off as desired by the shut-off assembly. As previously indicated, the shut-off assemblies shown in FIGS. 1B-1D are particularly well-suited to produce such a two-layer container 500.

As indicated, parisons with any number of layers may be produced with the use of the shut-off assemblies illustrated herein, or by modifications thereof which are clearly within the scope of the present invention.

Figure 12:
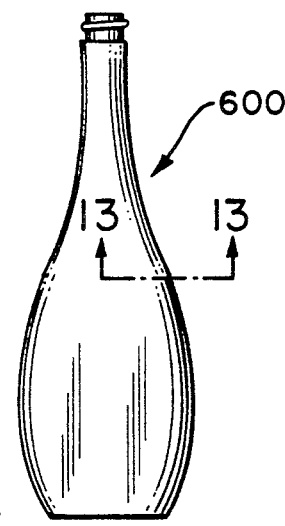
FIG. 12 is a perspective view of a three-layer container formed by a method and apparatus of the present invention.
Figure 13:
FIG. 13 is a cross-sectional view taken along the lines 13—13 of FIG. 12.

As a further example, FIG. 12 illustrates a container 600 which, as shown in FIG. 13, has three layers D, E and F. In this case, if, for example, the apparatus of FIG. 1 is used, the resins used to form layers D, E and F are introduced through channels 20, 40 and 50. One layer is a scrap-containing layer and the other two layers may contain different materials as compared with one another. If they contain the same materials, the scrap layer can but need not also include regrind from other sources containing different materials.

Figure 14:
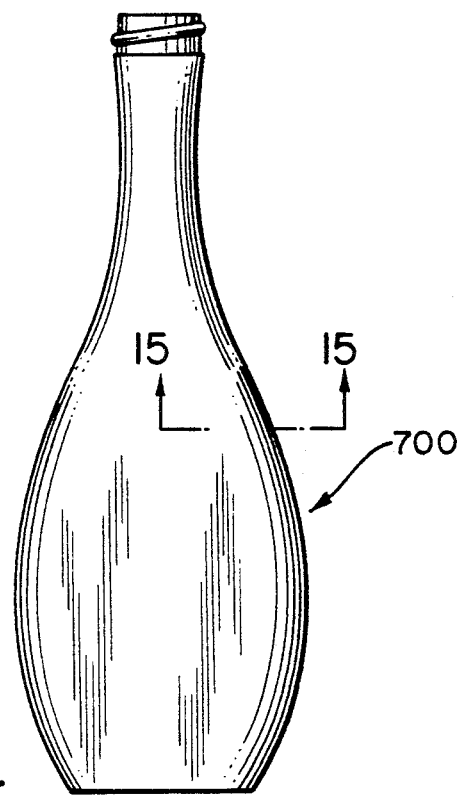
FIG. 14 is a perspective view of a four-layer container formed by a method, apparatus and parison of this invention.
Figure 15:
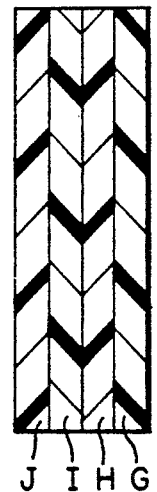
FIG. 15 is a cross-sectional view along the lines 15—15 of FIG. 14.

FIG. 14 illustrates a container 700 which, as shown in FIG. 15 has four layers G, H, I and J, one of which is a scrap-containing layer of the type produced by the apparatus and method of this invention.

Figure 16:
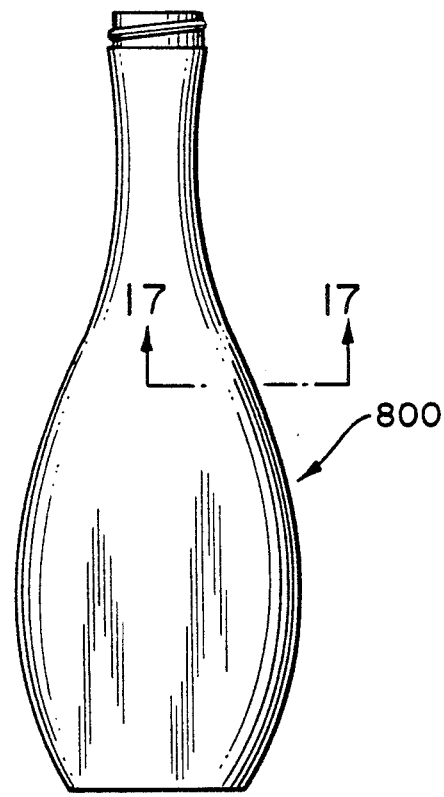
FIG. 16 is a perspective view of a five-layer container formed by a method, apparatus and parison of this invention.
Figure 17:
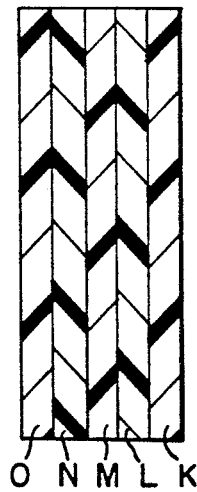
FIG. 17 is a cross-sectional view along the lines 17—17 of FIG. 16.

FIG. 16 illustrates another container 800 which, as shown in FIG. 17, has five layers K, L, M, N and 0, one of which is a scrap containing layer of the type produced by the present apparatus and method of this invention.

Of course, in FIGS. 14–17, adjacent layers are of different materials—otherwise if adjacent "layers" contain the same materials, they would not be considered separate layers.

As illustrated in FIGS. 8–17, another key feature of this invention, in addition to the apparatus and method described herein, is a multi-layer container, preferably made by the apparatus and method of this invention, having at least one layer of or containing scrap which includes, but is not limited to, regrind from parison sections Y which have a portion which contains less than all of the layers used in that parison's sections X which form the container. In the description of containers illustrated herein, the references to "scrap" or "regrind" contemplate a regrind of a parison section Y having a portion—preferably the entirety or a major portion—which contains less than all of the layers that are in the parison sections used to form the container. Herein, the layers used to form parison sections X are sometimes referred to as "N" and the resin stream(s) to be eliminated or reduced in sections Y are sometimes referred to as "B".

Figure 18:
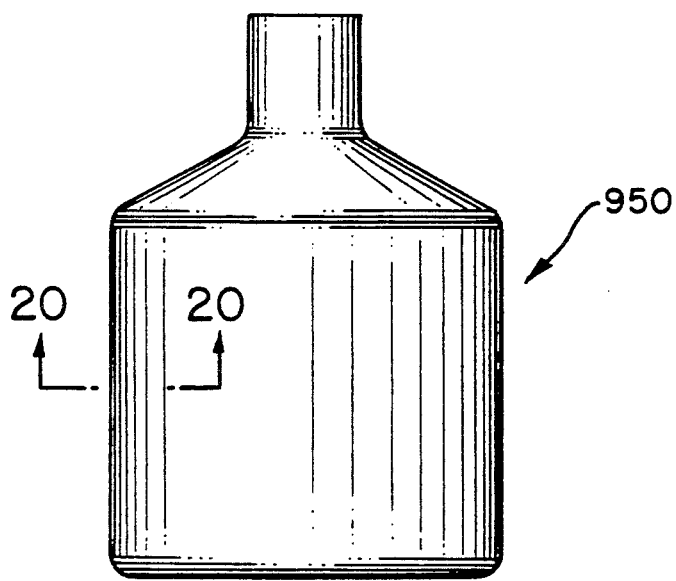
FIG. 18 is a perspective view of another multi-layer container formed by a method, apparatus and parison of this invention.
Figure 20:
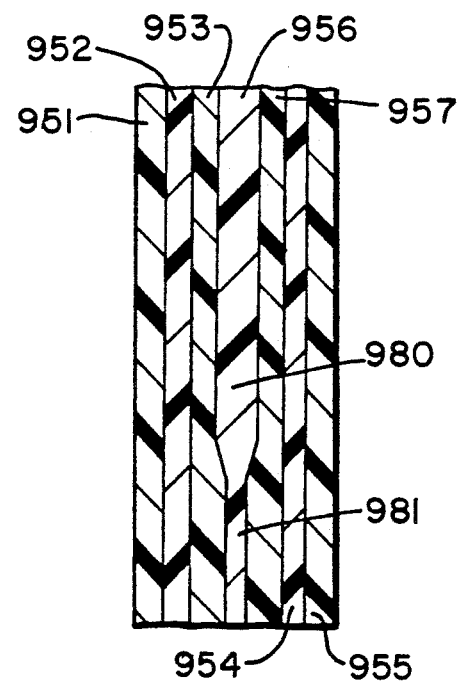
FIG. 20 is a vertical cross-sectional view with portions broken away as would be taken along the lines 20—20 of FIG. 18.

FIG. 18 illustrates another container 950 of the present invention, a cross-section of whose wall is shown in FIG. 20. In FIG. 20, it will be observed that the wall structure of the cross-sectioned area of layer 956 varies from being relatively thick as at 980 to being relatively thin, as at 981, and the thickness of adjacent layers 953 and 957 vary conversely. From a commercial standpoint, this is a very important new development because there are certain extrusion blow molded containers with respect to which it is desirable (for cost reasons, for example) to vary the thickness of one or more layers in various areas of the container. In FIG. 20, layers 951 and 955 may be comprised of structural materials of the type desired, layers 952 and 954 may be comprised of adhesive materials, layer 953 may be or contain scrap, and layer 956 may be comprised of a gas-barrier material. Layer 957 is optional and may be comprised of any suitable material.

Figure 19:
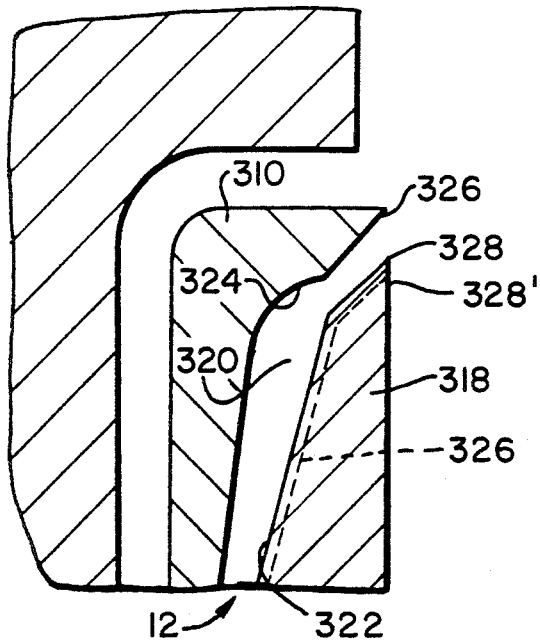
FIG. 19 is a vertical cross-section, with portions broken away, of a resin flow interruption mechanism or shutoff assembly of this invention.

FIG. 19 illustrates another embodiment of method and apparatus of this invention for interrupting, stopping or modulating flow of one or more streams within a multi-stream extrusion die. In accordance with this invention, interruption or termination need not be done by means of physical structure. FIG. 19 further shows that interruption or termination of flow can be effected without bringing an element such as sleeve element 18a into actual contact with a die wall surface such as die wall 26 of FIG. 1 or 2. In FIG. 19, surface 328 of sleeve element 318 need not contact die wall surface 326 of die member 310. Interruption or shut-off of flow of resin stream 12 in this case can be accomplished by providing a reservoir or area, for example 320, for the accumulation of a desired volume of resin material, here, for example, by providing tapered wall 322 and arcuate wall 324. Movements of sleeve element 318 relative to die member 310, e.g. by retracting the element from the position shown, to the position of dashed line 328', enlarge the volume of the reservoir or area 320 by the amount between the solid line 322 and the dashed line 328'. The additional volume thereby created for reservoir 320, provides an accumulation area for additional resin 12 (Resin B) so that the flow of resin stream 12 exiting from between elements 326 and 328 may thereby accordingly be interrupted completely, or reduced in rate and/or volume partially, in a controlled manner. The apparatus shown in FIG. 19 can be used to form a container such as shown in FIGS. 18 and 20 having a wall in which resin B has been reduced in thickness.

A main advantage of this invention, is to provide methods and die head apparatus for selectively reducing, interrupting or completely shutting off the flow of one or more resin streams from a multi-resin stream, so that the material of the interrupted or shut off stream can be reduced or substantially eliminated from the portions of the parison (sections Y) which become the flash. Another advantage is to provide methods and apparatus in a die head for controlling the amount or extent that such interrupted or shut-off materials appear in the flash, to desired or tolerable amounts depending on, among other factors, the cost or availability of the material, the precision of the equipment, the length of the flash, and the ability to utilize the flash as scrap.

These advantages are obtained by providing methods and apparatus for preventing, limiting or controlling the extent and/or duration of contact and/or drag between the stream(s) to be interrupted or shut-off and structure or stagnant polymer, downstream of the downstream-most point of interruption or shut-off, e.g. 31a in FIG. 1, 31a' on FIG. 1A, ,31a'' in FIG. 1B, 31a''' in IC and 31a'''' in FIG. 1D for clean interruption shut-off. Where no interrupted or shut-off material can appear in the flash, it is preferred that no contact or drag occur, and the shut-off assembly embodiments shown in FIGS. 1, 1A, 1B, 2, 3 or 3A are suitable for this purpose.

Alternatively, where some amount of interrupted or shut-off material can be tolerated in the flash, die element 31''' may have a predetermined relatively short-downstream wall 200''' beyond point 31a''' as shown in FIG. 1C (see FIG. 1D also) or, where the shut-off assembly is operative adjacent die mouth 150'''', as in FIG. 1D, the element 311'''' may extend by a similar distance 200'''' beyond point 31a''''.

The reason why downstream contact usually is to be prevented when no interrupted or shut-off material is intended to appear in the flash, or when controlled or tolerable desired amounts can appear in the flash, is that stagnant polymer or wall contact with the resin stream(s) interrupted or shut-off, downstream of the downstream-most interruption or shut-off point between the shutting-off member, here sleeve element 18a and the opposing member, first die element 31, creates drag of the contacting or adjacent resin material of the resin stream on the downstream stagnant material or downstream surface of the structure or wall (e.g., surfaces 200''' and 200'''' in FIGS. 1C and 1D). The flow rate of the dragged resin material will, therefore, be less that that of the resin materials flowing without such drag, e.g. in FIGS. 1C and 1D, those more centrally in the channel in question. In such case, instead of a clean, sharp interruption, cut-off or termination (e.g. see terminal edges 48 and 49 in FIGS. 4 and 5), due to the contact and consequent drag, the termination of resin(s) section X would not be clean but would be smeared out and, in extreme cases, would overlap the leading edge of resin stream(s) of the following parison section Y.

The prevention of contact between the interrupted or shut-off resin stream 12 and the downstream structure or stagnant polymer can be accomplished by any method or means in accordance with this present invention. Thus, it can be accomplished for example by flow of an interstitial stream, e.g., resin stream 14 in FIGS. 1 and 2, or by die design, e.g. no downstream die wall contact with the first die element as provided in the embodiments shown in FIGS. 1, 2 and 1A and 1B. In the preferred embodiment, wall 52a is radially offset away from the axis of the die head to prevent contact between the resin stream 12 with wall 52 downstream of shut-off point 31a, as indicated in FIG. 1.

The shut-off or control assembly of this invention can be employed other than to fully interrupt or shut off flow. As illustrated in FIG. 20, it may be employed in the formation of parison sections or portions such that the gap between the shut-off element here, e.g., sleeve element 18a in FIG. 1 and the opposing cooperative member, here, e.g. die element 31 in FIG. 1 is controlled, so that the flow of resin(s) B from a channel, e.g. 40 in FIG. 1, is modulated or throttled as the merging area MA. Accordingly, the amount of material and thickness of the stream(s) B and resulting layer of the article to be formed may be varied as desired within the wall of section X and the container. This feature can also be used advantageously to control and limit the amount of expensive material used in forming Section X, as shown in FIG. 20.

Apparatus and method of this invention and the description above can be applied to interrupt, terminate and/or control flow of more than just resin stream from one channel. One or more assemblies can be operated to so affect flow from more than one channel.

We claim:
1. An extrusion die comprising
   a head having an interior wall;
   a die member within said head having an outer wall defining with said interior wall a first channel for flow of a first resin stream therethrough and an inner wall at one end;
   a sleeve element mounted within said die member to define a second channel therebetween for a second resin stream, said sleeve element being movable between a closed position and an open position relative to said die member and having a surface for mating with said die member in said closed position to close said second channel; and
   a sleeve support within said sleeve element having an outer wall defining a third channel with said sleeve element for flow of a third resin stream therethrough and spaced from said wall of said head to define an exit therebetween for the resin streams.

2. An extrusion die as set forth in claim 1 wherein said inner wall of said die member is tapered and said surface of said movable sleeve element is tapered to mate with said inner wall of said die member in said closed position.

3. An extrusion die as set forth in claim 2 wherein said inner wall of said die member extends from said movable sleeve element in said closed position of said sleeve element and in facing relation to said outer wall of said sleeve support to define a channel therebetween for a flow if the first and second resin streams therebetween.

4. An extrusion die as set forth in claim 1 wherein said die member has a radially directed lip at one end and said movable sleeve element is disposed to mate with an underside of said lip in said closed position.

5. An extrusion die as set forth in claim 1 wherein said side member and said sleeve define an exit orifice in said open position of said sleeve element and wherein said die wall is spaced from said interior wall of said head adjacent to and downstream of said exit orifice to preclude contact between said die member and said interior wall.

6. An extrusion die comprising
   a sleeve support having an outer wall;
   a sleeve element mounted around said sleeve support to define a channel therebetween for a flow of a first resin stream therebetween, said sleeve element being movable between a closed position and an open position relative to said sleeve support and having a surface for mating with said sleeve support in said closed position to close said channel; and
   a die member mounted around said sleeve element and said sleeve support, said die member having an inner wall defining a second channel with said sleeve element for a flow of a second resin stream therebetween and facing said sleeve support to define a third channel therebetween for a flow of the first and second resin streams therein with said sleeve element in said open position.

7. An extrusion die for forming a multi-wall parison for blow molding, said die comprising
   a head having an interior wall;
   a die member within said head having an outer wall defining with said interior wall a first channel for flow of a first resin stream therethrough and an inner wall at one end;
   a sleeve element mounted within said die member to define a second channel therebetween for a second resin and a reservoir for the second resin upstream of said second channel relative to the flow of the second resin, said sleeve being movable relative to said die member to selectively adjust the volume of said reservoir and the size of said second channel; and
   a sleeve support within said sleeve element having an outer wall defining a third channel with said sleeve element for flow of a third resin stream therethrough and spaced from said wall of said head to define an exit therebetween for the resin streams.

* * * * *